United States Patent
Nagae

(10) Patent No.: US 7,312,894 B2
(45) Date of Patent: Dec. 25, 2007

(54) COLOR CONVERSION APPARATUS

(75) Inventor: Takeshi Nagae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1020 days.

(21) Appl. No.: 10/395,097

(22) Filed: Mar. 25, 2003

(65) Prior Publication Data

US 2003/0185441 A1    Oct. 2, 2003

(30) Foreign Application Priority Data

Mar. 29, 2002 (JP) ............................. 2002-097112
Nov. 7, 2002 (JP) ............................. 2002-324462

(51) Int. Cl.
    *G06K 9/00* (2006.01)
(52) U.S. Cl. .................. 358/1.9; 358/523; 358/524
(58) Field of Classification Search ................ 358/1.9, 358/518, 523, 524; 382/162, 167
    See application file for complete search history.

(56) References Cited

U.S. PATENT DOCUMENTS 6,603,483 B1 *  8/2003  Newman ................... 345/593

FOREIGN PATENT DOCUMENTS

| JP | 2-131674 | 5/1990 |
|---|---|---|
| JP | 5-300367 | 11/1993 |
| JP | 2001-103330 A | 4/2001 |

OTHER PUBLICATIONS

Japanese Patent Office Notice of Rejection, dated Oct. 3, 2006, issued in Japanese Patent Application No. 2002-324462.

* cited by examiner

*Primary Examiner*—Kimberly A. Williams
(74) *Attorney, Agent, or Firm*—Staas & Halsey LLP

(57) ABSTRACT

A color conversion profile is set in the color conversion table 3, a color converting process is performed on input data, and a conversion result is output to a color adjustment unit 2. The color adjustment unit 2 color-adjusts the output data color-converted by the color conversion unit 1 based on the input data, outputs the output data to a printer device not shown in the attached drawings for printing process. With the above mentioned configuration, provided are a color conversion apparatus and a color conversion program capable of adjusting an unnecessary color mixed into the output data converted based on the color conversion profile is adjusted, and, on the other hand, if there is no visual recognizability problem with the color conversion data, then outputting the output data as is to a printer device, and maintaining the visual recognizability of a regeneration image, thereby realizing a high-speed process.

4 Claims, 18 Drawing Sheets

| NO | INPUT DATA | | | | COLOR CONVERSION DATA | | | | ADJUSTED DATA | | | |
|---|---|---|---|---|---|---|---|---|---|---|---|---|
| | Ci | Mi | Yi | Ki | Co | Mo | Yo | Ko | C | M | Y | K |
| 1 | 0 | 0 | 100 | 0 | 1 | 2 | 95 | 0 | 0 | 0 | 95 | 0 |
| 2 | 0 | 100 | 0 | 0 | 3 | 90 | 10 | 0 | 0 | 90 | 10 | 0 |
| 3 | 100 | 0 | 0 | 0 | 95 | 3 | 5 | 0 | 95 | 3 | 5 | 0 |
| 4 | 0 | 100 | 80 | 0 | 5 | 80 | 70 | 0 | 0 | 80 | 70 | 0 |
| 5 | 80 | 0 | 70 | 0 | 70 | 6 | 70 | 0 | 70 | 6 | 70 | 0 |
| 6 | 90 | 80 | 0 | 0 | 80 | 70 | 5 | 0 | 80 | 70 | 5 | 0 |

FIG. 3

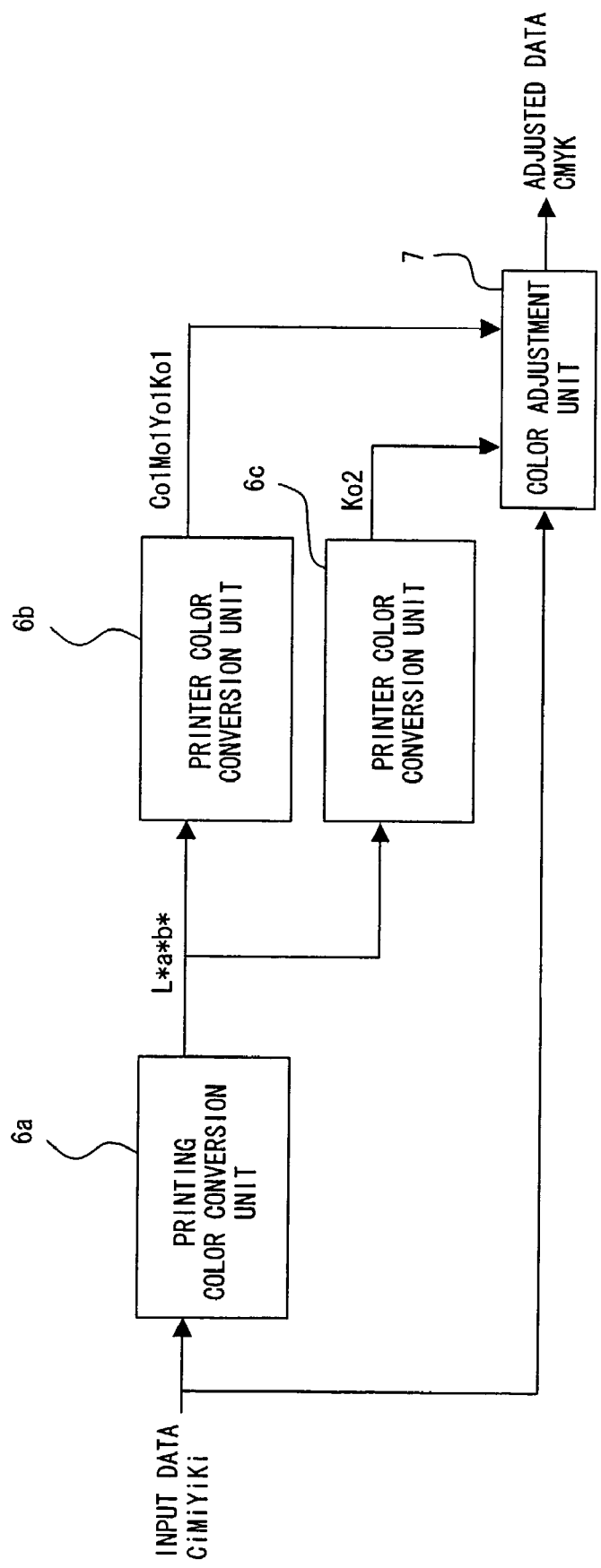
F I G. 7

| NO | INPUT DATA | | | | COLOR CONVERSION DATA | | | | ADJUSTED DATA | | | |
|---|---|---|---|---|---|---|---|---|---|---|---|---|
| | Ci | Mi | Yi | Ki | $Co_1$ | $Mo_1$ | $Yo_1$ | $Ko_1$ | C | M | Y | K |
| 1 | 0 | 0 | 0 | 100 | 70 | 60 | 65 | 50 | 0 | 0 | 0 | 95 |
| | | | | | 0 | 0 | 0 | 95 (Ko2) | | | | |

F I G. 8

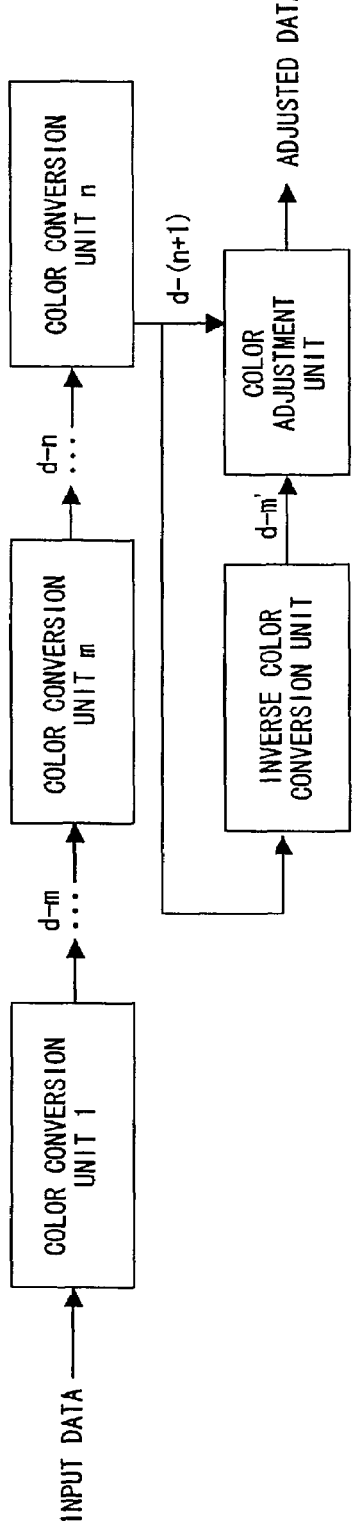
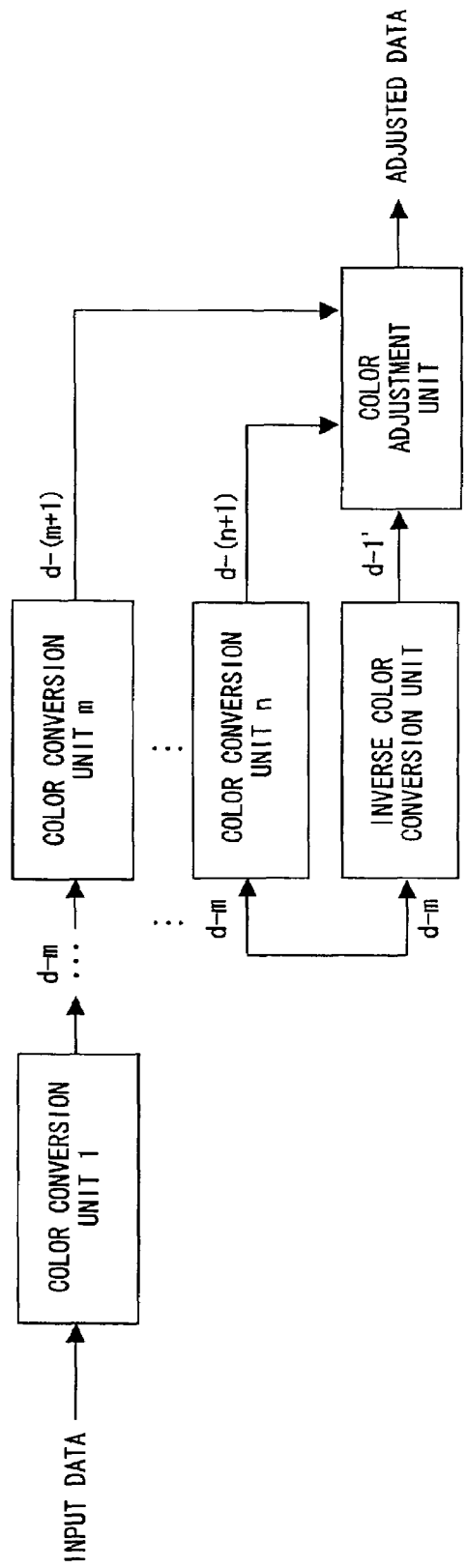

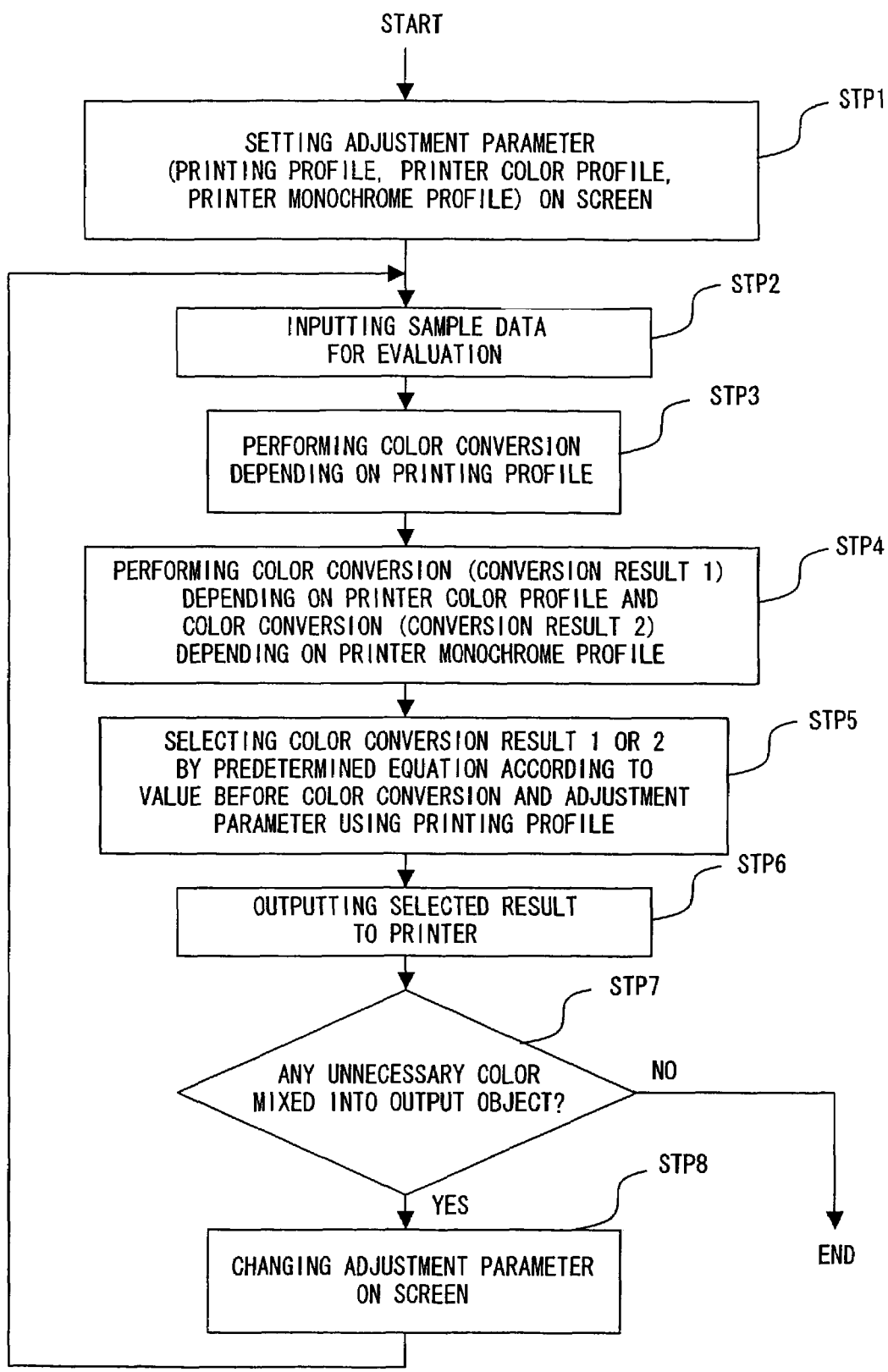
F I G. 1 6

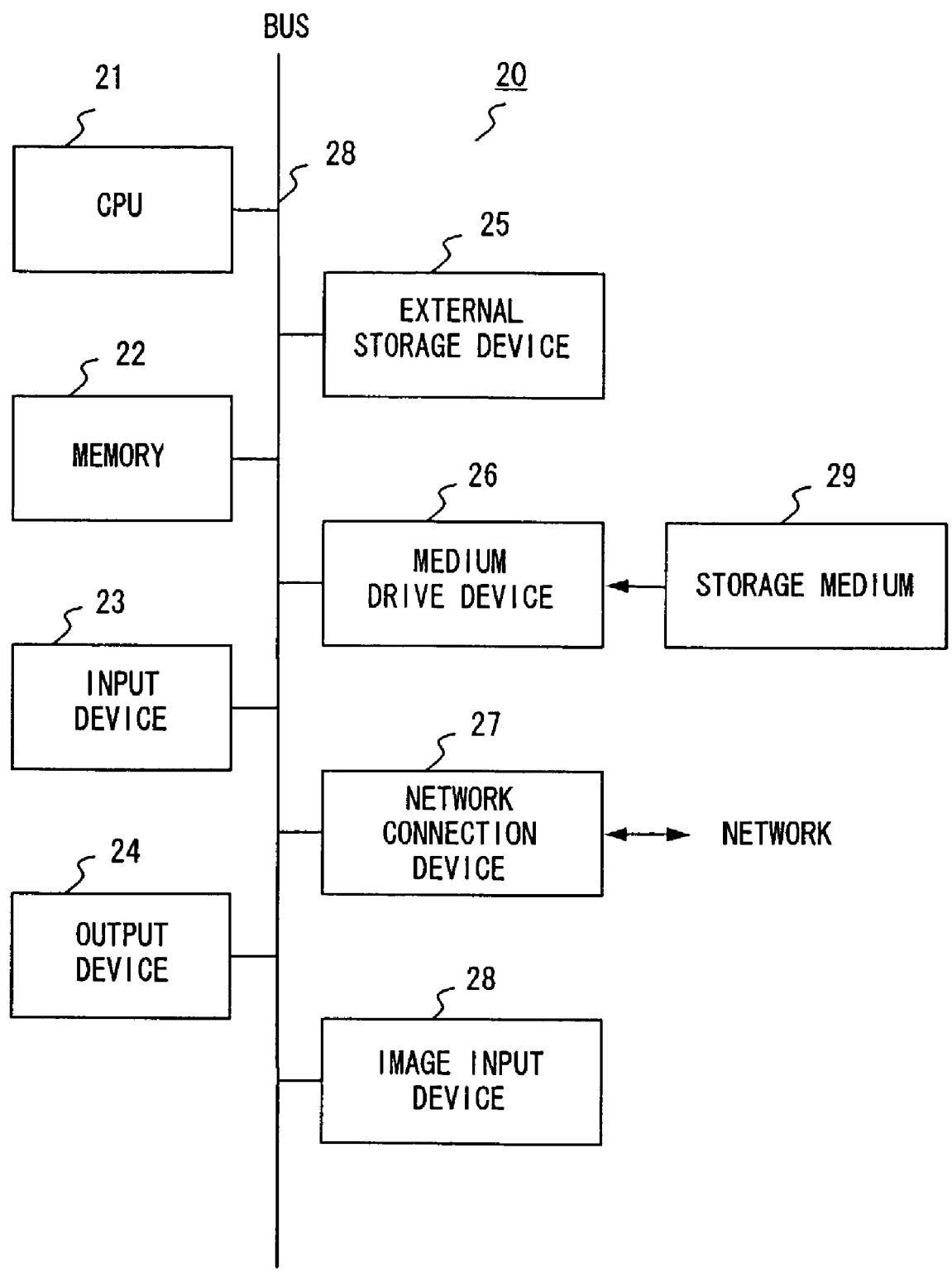
F I G. 17

COLOR CONVERSION APPARATUS

BACKGROUND OF THE INVENTION

1. Field of the Invention

The present invention relates to a color conversion apparatus and a color conversion program for correcting a color error between different devices.

2. Description of the Prior Art

Recently, with the diffusion of computers, various peripheral devices such as a printer device, a scanner device, a CRT display, etc. have become widespread. For example, original data read from a scanner device is displayed on a CRT display, and printed out on a printer device. Furthermore, print data is transmitted to a printer through a network for a printing process.

Therefore, when the same print data is used, a color correction is required between devices. For example, between a printer and a printer device, a color converting process is performed on print data using a proof target profile of the printer and an output target profile of the printer device.

However, color matching can be performed in the above mentioned method, but an unexpected color mixing result can be obtained by, for example, regenerating black (K), what is called monochrome print, in a CMYK system, regenerating the print of only magenta (M) in an MC system, etc. As a result, especially when a printer device in the ink jet system is a proof output device, etc., an unexpected color can be printed out.

Conventionally, to solve these problems, a method of adding a binding condition to a primary color and a secondary color to be input in the input CMYK system, and regenerating a color conversion table has been suggested so that an unexpected color cannot be mixed.

However, in the above mentioned method, for example, although black can be regenerated by black, and magenta can be regenerated by magenta, a long processing time is required. Therefore, it is not appropriate for a practical operation.

Furthermore, since a ground-color is not a problem in some devices, regenerating a color conversion table is an inefficient operation. Additionally, regenerating a color conversion table can lose the information about the original color conversion profile, thereby causing the possibility that an unexpected color can be mixed by, for example, an arithmetic error, etc.

SUMMARY OF THE INVENTION

The present invention has been developed to solve the above mentioned problem, and aims at providing a color conversion apparatus and a color conversion program capable of quickly performing a color converting process without having a bad influence on the visual recognizability by adjusting the output of a profile without regenerating a color conversion table.

That is, the above mentioned object can be attained by the present invention by providing a color conversion apparatus including: a color conversion unit having a color conversion profile corresponding to a device, and performing color conversion on input data containing color information according to the color conversion profile; a color adjustment unit for adjusting based on the input data the color data converted by the color conversion unit; and an output unit for outputting the adjusted color data adjusted by the color adjustment unit to the device.

The device is configured not only by a printer device in the subtractive process system but also by a display device in the additive process system, and the above mentioned color conversion profile is a conversion table of color data according to the characteristics of a device.

The above mentioned color conversion unit uniformly perform color conversion on the input data using a color conversion profile. Therefore, the color conversion can be uniformly performed although there is no problem with visual recognizability. On the contrary, the color conversion can result in the mixing of colors. Thus, the color adjustment unit adjusts color according to a predetermined adjustment parameter.

With the above mentioned configuration, the mixing of colors can be avoided, and a color conversion result based on the color conversion profile can be output as is when there is no problem about the visual recognizability, thereby quickly performing the color converting process.

Additionally, the present invention can also configure the above mentioned color converting process by a program. With the configuration, the mixing of colors can be avoided, and the color converting process can be quickly performed.

BRIEF DESCRIPTION OF THE DRAWINGS

FIG. 3 shows a practical example of input data, output data, and adjusted data;

FIG. 7 shows a practical system configuration of the third embodiment of the present invention;

FIG. 8 shows the data format of print data;

FIGS. 10A and 10B show system configurations of the fourth embodiment of the present invention;

FIG. 16 is a flowchart for explanation of the process according to the present invention;

FIG. 17 shows the configuration of an information processing device; and

DESCRIPTION OF THE PREFERRED EMBODIMENT

The embodiments of the present invention are described below by referring to the attached drawings.

First Embodiment

Figure 1:
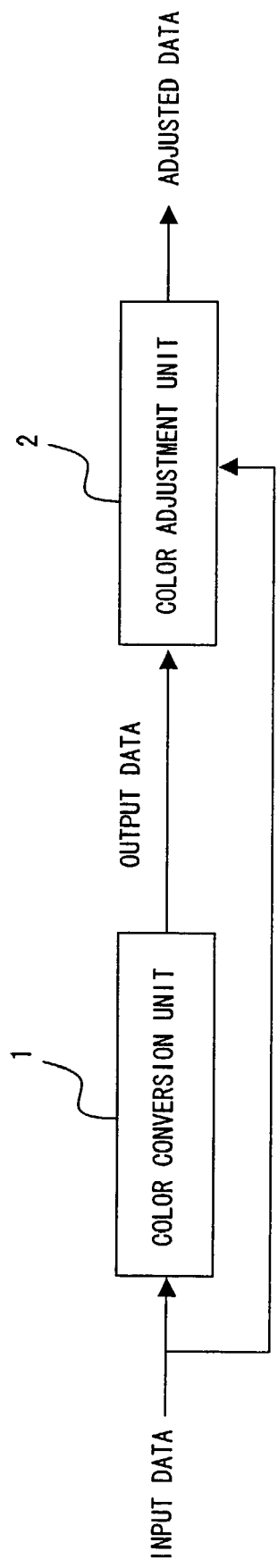
FIG. 1 shows a system configuration of the first embodiment of the present invention.

FIG. 1 shows a system configuration of the first embodiment of the present invention.

The system is configured by a color conversion unit 1 and a color adjustment unit 2. The color conversion unit 1 is provided with a color conversion profile described later, and an adjustment parameter described later is set in the color adjustment unit 2. Input data is input into the color conversion unit 1, and the color conversion unit 1 performs the color converting process on the input data according to the color conversion profile. Thus, the output data after the color converting process is further color-adjusted by the color adjustment unit 2, and adjusted color data is output. The input data can be cyan (C), magenta (M), yellow (Y), and black (K). The data is gray-scale data for each pixel.

Figure 2:
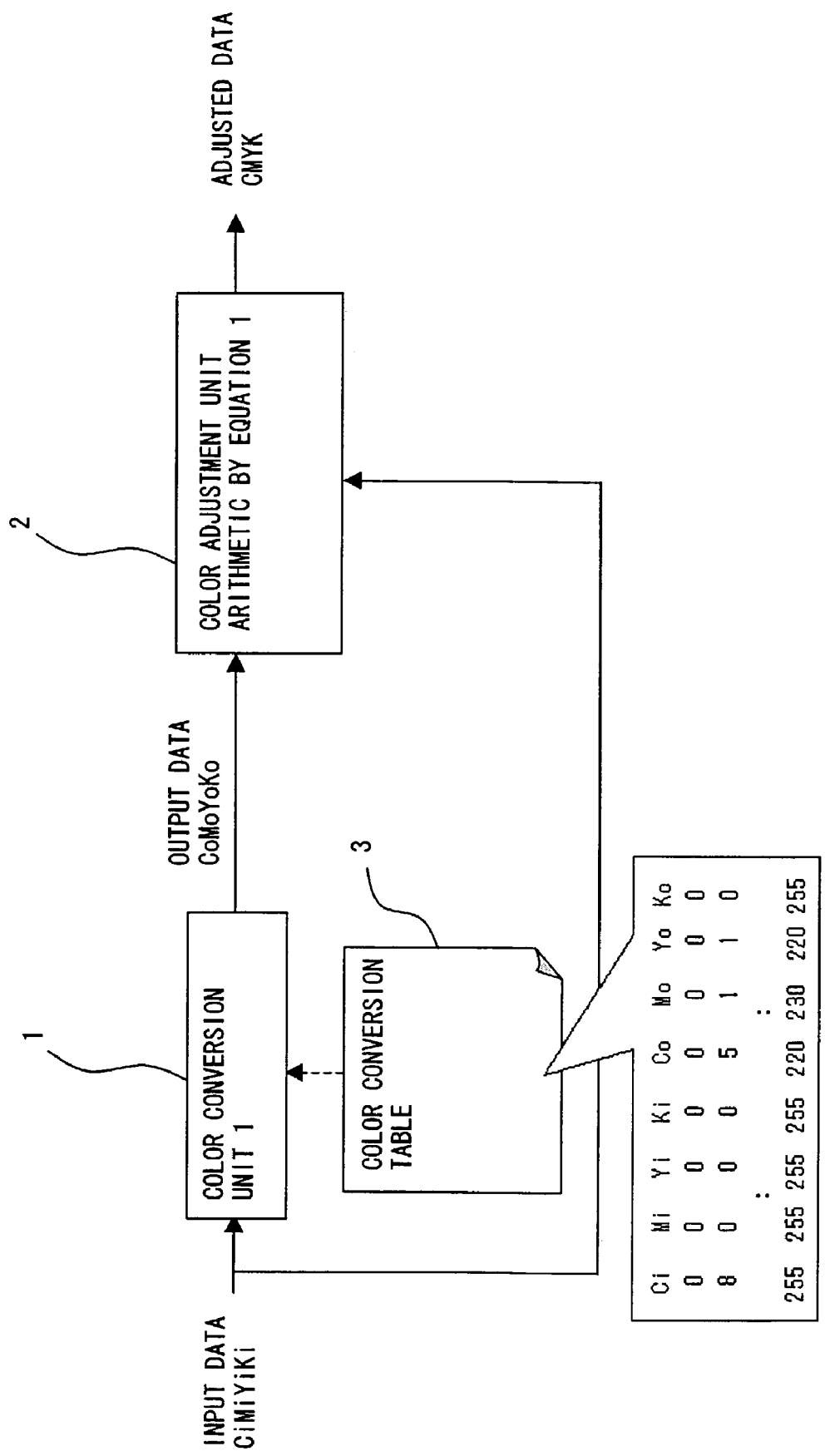
FIG. 2 shows a practical system configuration of the first embodiment of the present invention.

FIG. 2 shows a more practical system configuration of the above mentioned system, and a practical example of a color conversion table provided for the color conversion unit 1. A color conversion table 3 is a profile for conversion from the input data (Ci Mi Yi Ki) in the CMYK system to the output data (Co Mo Yo Ko) corresponding to the output device, and has a conversion value shown in FIG. 2.

The profile describes the output data (Co Mo Yo Ko) corresponding to the combination of the input data (Ci Mi Yi Ki), and can be obtained by interpolating a vicinal gray-scale value if there is no corresponding data in the combination. For example, when the input data (Ci Mi Yi Ki) is (4, 0, 0, 0), the input data is the intermediate point between (0, 0, 0, 0) and (8, 0, 0, 0), interpolated by the surrounding color, and the output data (3, 1, 1, 0) is obtained.

The above mentioned color-converted output data (Co Mo Yo Ko) is treated by the color adjustment unit 2 in the following adjusting process. The color adjustment unit 2 performs a color adjustment according to an adjustment parameter. For example, as shown in the following equation (1), if the input data is (Ci Mi Yi Ki), the output data is (Co Mo Yo Ko), and the adjusted color data after the color adjustment is (C M Y K), then the color adjusting process is performed by the following equations.

$$C = Co \times (Ci \vee \overline{Mi} \vee Yi \vee Ki) \cdot (Ci \vee Mi \vee \overline{Yi} \vee \vee Ki) \cdot (Ci \vee \overline{Mi} \vee \overline{Yi} \vee Ki)$$

$$M = Mo \times (\overline{Ci} \vee Mi \vee Yi \vee Ki) \cdot (Ci \vee Mi \vee \overline{Yi} \vee Ki)$$

$$Y = Yo \times (Ci \vee Mi \vee Yi \vee Ki) \cdot (Ci \vee Mi \vee Yi \vee Ki)$$

$$K = Ko$$

where · indicates a logical product, and ∨ indicates a logical sum.

The color adjusting process is described below using a practical value by referring to FIG. 3. Each value shown in FIG. 3 indicates a gray-scale level.

First, in the example No. 1 shown in FIG. 3, the input data (Ci Mi Yi Ki) is (0, 0, 100, 0), and cyan (C), magenta (M), black (K) all indicate 0, and only yellow (Y) is the input data with the gray-scale level of 100. In this case, the above mentioned input data is converted by the color conversion unit 1 into output data (1, 2, 95, 0). The converting process corresponds to a device and is performed according to the above mentioned color conversion profile.

Then, the color adjustment unit 2 performs the adjusting process based on the input data and the output data. If the practical values of No. 1 are input into the equation (1), the adjusted data (C M Y K) is expressed as follows.

$$C = 1 \times (0 \vee 1 \vee 1 \vee 0) \cdot (0 \vee 0 \vee 0 \vee 0) \cdot (0 \vee 1 \vee 0 \vee 0)$$

$$M = 2 \times (1 \vee 0 \vee 1 \vee 0) \cdot (0 \vee 0 \vee 0 \vee 0)$$

$$Y = 95 \times (0 \vee 0 \vee 1 \vee 0) \cdot (0 \vee 0 \vee 1 \vee 0)$$

$$K = 0$$

From the equations above, the adjusted data (C M Y K) is (0, 0, 95, 0), and the adjusted data is color data of yellow (Y) only. Therefore, when the input data is only yellow (Y), the color adjustment unit 2 according to the present embodiment suppresses the mixing of cyan (C) and magenta (M) which are mixed in the converting process performed by the color conversion unit 1, thereby adjusting the color data into the data without the mixing of other colors. As a result, the input data of yellow (Y) can be printed out as yellow (Y) only.

In the example of No. 2 shown in FIG. 3, the input data (Ci Mi Yi Ki) is (0, 100, 0, 0), and cyan (C), yellow (Y), and black (K) are all 0, and only magenta (M) refers to the color data with the gray-scale level of 100. In this case, the color conversion unit 1 converts the color data according to the color conversion profile, and generates the output data (3, 90, 10, 0).

Then, the color adjustment unit 2 performs the color adjustment based on the input data and output data, and inputs practical values of No. 2 into the equation (1). In this case, the adjusted data (C M Y K) can be represented as follows.

$$C = 3 \times (0 \vee 0 \vee 0 \vee 0) \cdot (0 \vee 1 \vee 1 \vee 0) \cdot (0 \vee 0 \vee 1 \vee 0)$$

$$M = 90 \times (1 \vee 1 \vee 0 \vee 0) \cdot (0 \vee 1 \vee 1 \vee 0)$$

$$Y = 10 \times (0 \vee 1 \vee 0 \vee 0) \cdot (0 \vee 1 \vee 0 \vee 0)$$

$$Y = 0$$

From the equations above, the adjusted data (C M Y K) is (0, 90, 10, 0), and the adjusted data is color data of magenta (M) and yellow (Y). Therefore, when the input data is only magenta (M), cyan (C) is normally mixed in the converting process performed by the color conversion unit 1, but the color adjustment unit 2 according to the present embodiment performs the color adjustment into the color data containing only magenta (M) and yellow (Y). Although yellow (Y) is mixed into other colors, there arises no problem if it is at the gray-scale level of 10, thereby having no bad influence on the visual recognizability.

In the examples No. 3 through No. 6, the values shown in FIG. 3 are similarly and sequentially input, and the color adjustment unit 2 performs the color adjustment so that the mixing of other colors, which have an influence on the visual recognizability, can be avoided, thereby more quickly performing the color converting process.

That is, the color conversion apparatus according to the present embodiment can provide the output of the color conversion unit 1 as is for the printer device when there is no influence on the visual recognizability, and removes the output of the corresponding color when it has a bad influence on the visual recognizability.

As described later, the adjustment parameter set in the color adjustment unit 2 can be changed so that the color converting process can be more flexibly performed.

Second Embodiment

Described below is the second embodiment of the present invention.

Figure 4:
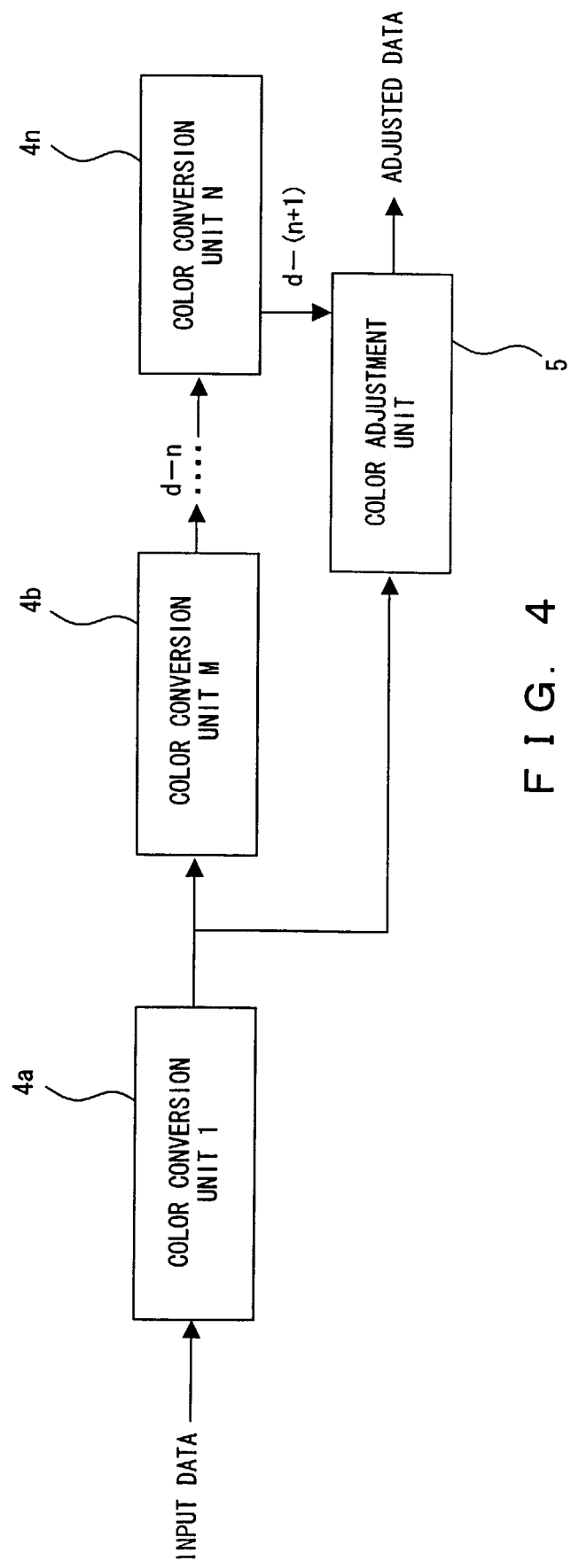
FIG. 4 shows a system configuration of the second embodiment of the present invention.

FIG. 4 shows a system configuration of the present embodiment. In FIG. 4, the system is configured by a plurality of color conversion units 4a, 4b, . . . , and a color adjustment unit 5, and the color conversion units 4a, 4b, . . . is provided with a color conversion profile as described above, and an adjustment parameter is set in the color adjustment unit 5. Input data is input into the color conversion unit 4a, and the color converting process is performed on the input data based on the color conversion profile. Thus, the color-converted output data is further transmitted to the color conversion unit 4b and treated in the color converting process. Then, it is finally transmitted to the color adjustment unit 5 for color adjustment, and adjusted data is output.

Figure 5:
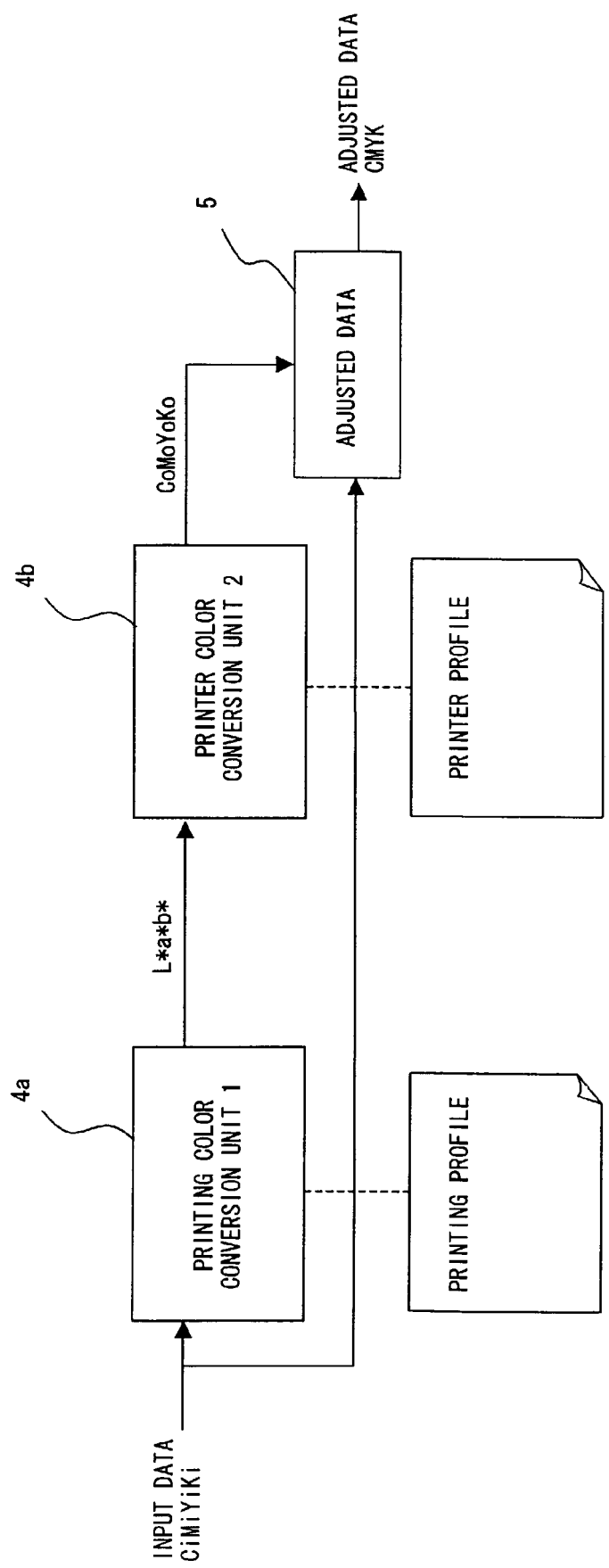
FIG. 5 shows a practical system configuration of the second embodiment of the present invention.

FIG. 5 shows a more practical configuration of the system. The color conversion table provided in the color conversion unit 4a is a printing profile according to which input data can be converted into color data (L*a*b*) corresponding to a standard color model. The color conversion table provided for the color conversion unit 4b is a printer profile according to which the color data (L*a*b*) can be converted into output data (Co Mo Yo Ko) in the CMYK system.

The above mentioned adjustment parameter is set in the color adjustment unit 5, and the output data output from the color conversion unit 4b can be color-adjusted. The color adjustment is similar to that according to the above mentioned first embodiment, and the input data of yellow (Y) only is adjusted into the color data of yellow (Y) only. When the color data contains cyan (C) and magenta (M), it is adjusted into the data with the mixing of a color influencing the visual recognizability suppressed.

With the above mentioned configuration, a high-speed color converting process can be realized while adjusting the color conversion of the color conversion profile.

In the present embodiment, the adjustment parameter set in the color adjustment unit 5 can be varied for a more flexible color converting process.

Third Embodiment

Described below is the third embodiment of the present invention.

Figure 6:
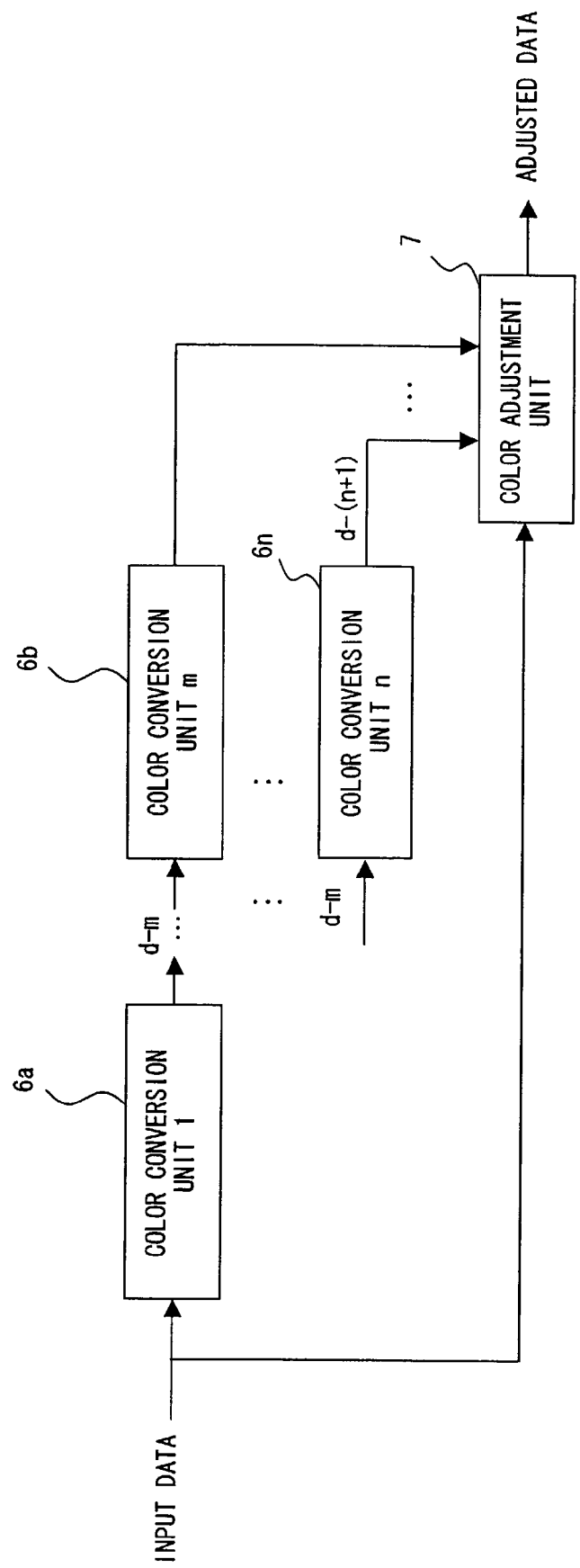
FIG. 6 shows a system configuration of the third embodiment of the present invention.

FIG. 6 shows a system configuration of the present embodiment. In FIG. 6, the system is configured by a plurality of color conversion units 6a, 6b, . . . , and a color adjustment unit 7, and the color conversion units 6a, 6b, . . . performs a color conversion in the CMYK system or a monochrome conversion.

FIG. 7 shows a more practical configuration of the system. The color conversion table provided in the color conversion unit 6a is a printing profile according to which input data can be converted into color data (L*a*b*) as described above. The color conversion table provided for the color conversion unit 6b is a printer profile, and is specifically a color conversion profile in the CMYK system. The color conversion table provided for the color conversion unit 6c is a printer profile, and is specifically a monochrome conversion profile.

The color adjustment unit 7 selects output data according to the adjustment parameter based on the input data (Ci Mi Yi Ki). The color conversion unit 6b in the CMYK system outputs data (Co1 Mo1 Yo1 Ko1), and the color conversion unit 6c in the monochrome system outputs data (K o2). The color adjustment unit 7 selects either output data (Co1 Mo1 Yo1 Ko1) or output data (K o2) based on the input data (Ci Mi Yi Ki).

The following equations are based on the adjustment parameter set in the color adjustment unit 7.

$$C = C\ o1 \times (Ci \vee Mi \vee Yi \vee \overline{Ki})$$

$$M = M\ o1 \times (Ci \vee Mi \vee Yi \vee \overline{Ki})$$

$$Y = Y\ o1 \times (Ci \vee Mi \vee Yi \vee \overline{Ki})$$

$$K = K\ o1 \times (Ci \vee Mi \vee Yi \vee \overline{Ki}) + K\ o2 \times \overline{(Ci \vee MI \vee Yi \vee \overline{Ki})}$$

In the above mentioned equations, ∨ indicates a logical sum.

The color adjusting process is described below using a practical value. FIG. 8 shows an example, and the input data (Ci Mi Yi Ki) is (0, 0, 0, 100). In this case, cyan (C), magenta (M), and yellow (Y) are all 0, and only black (K) is data with the gray-scale level of 100.

The input data is converted by the color conversion unit 6b into the output data (Co1 Mo1 Yo1 Ko1). The output data (Co1 Mo1 Yo1 Ko1) is (70, 60, 65, 50) as shown in FIG. 8. The color conversion unit 6c converts the data according to the monochrome profile into the output data (K o2: 95).

The color adjustment unit 7 performs a process according to the above mentioned adjustment parameter, and selects output data. That is, $$C = 70 \times (0 \vee 0 \vee 0 \vee 0)$$

$$M = 60 \times (0 \vee 0 \vee 0 \vee 0)$$

$$Y = 65 \times (0 \vee 0 \vee 0 \vee 0)$$

$$K = 50 \times (0 \vee 0 \vee 0 \vee 0) + 95 \times (1 \vee 1 \vee 1 \vee 1)$$

Therefore, the color conversion unit 6b outputs 0 by the above mentioned equations, the output data (K o2) is selected, and only the data of black (K) is output as adjusted data. When a black character is to be printed, it can also be regenerated in the CMYK system. However, since a black character is regenerated by the mixing of ink, a dull black character is displayed.

According to the present embodiment, since a black printed character is displayed using black (K) ink only, the character shows the characteristic of the black ink, and can realize, for example, a lustered black printed character, etc.

Fourth Embodiment

Described below is the fourth embodiment of the present invention.

This system generates input data from output data using the inverse color conversion unit when the input data is unclear, and a color adjustment is performed using the obtained input data.

Figure 9:
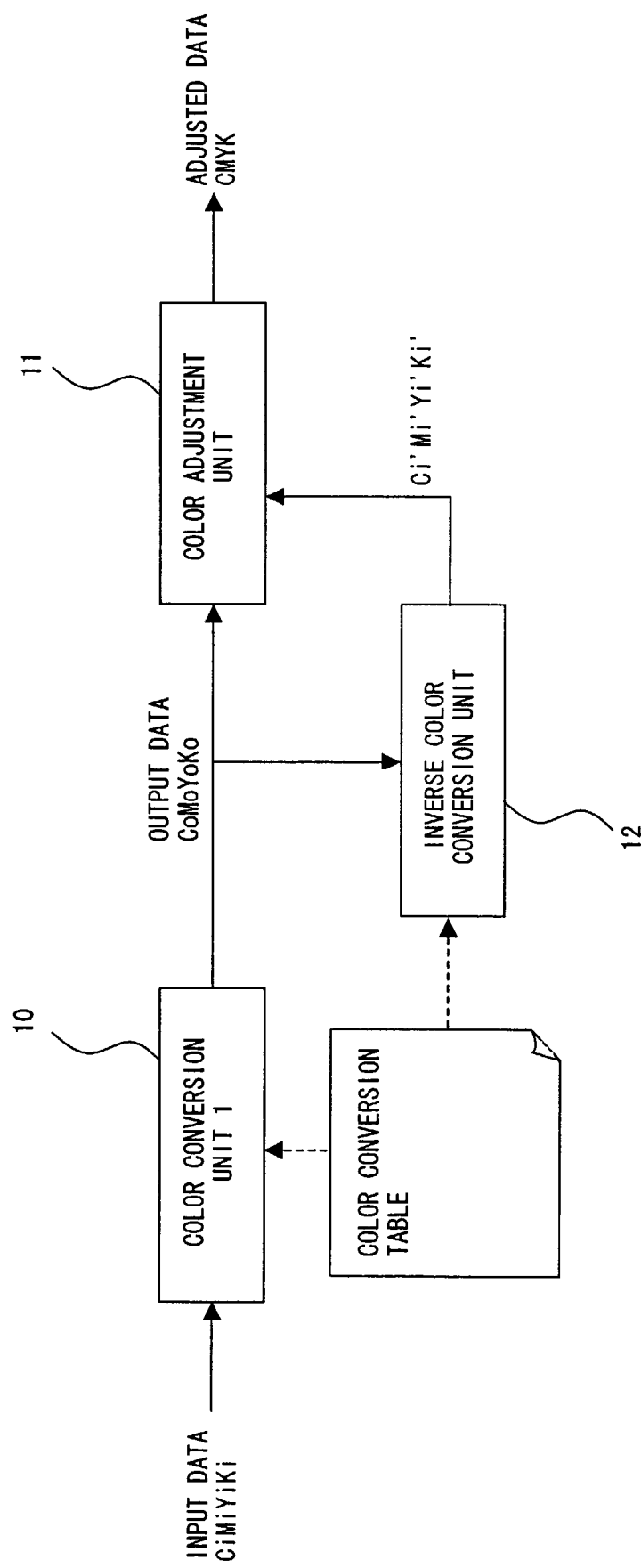
FIG. 9 shows a system configuration for explanation of the fourth embodiment of the present invention.

FIG. 9 shows a system configuration of the present embodiment. A color conversion unit 10 has a color conversion table for conversion from input data (Ci Mi Yi Ki) to output data (Co Mo Yo Ko), and a color adjustment unit 11 generates adjusted data (C M Y K) according to the output data (Co Mo Yo Ko). An inverse color conversion unit 12 receives the above mentioned output data (Co Mo Yo Ko), refers to the information in the color conversion table, and generates input data (Ci' Mi' Yi' Ki').

The generated input data (Ci' Mi' Yi' Ki') is output to the color adjustment unit 11, and is used in the color adjusting process by the color adjustment unit 11. The color adjusting process performed by the color adjustment unit 11 is the same as the process described above by referring to the first through third embodiments, and the explanation is omitted here.

In the process as described above, the output data obtained after the color conversion by the color conversion unit 10 is used when, for example, input data cannot be used, thereby generating the input data for use in the color adjusting process.

Figure 11:
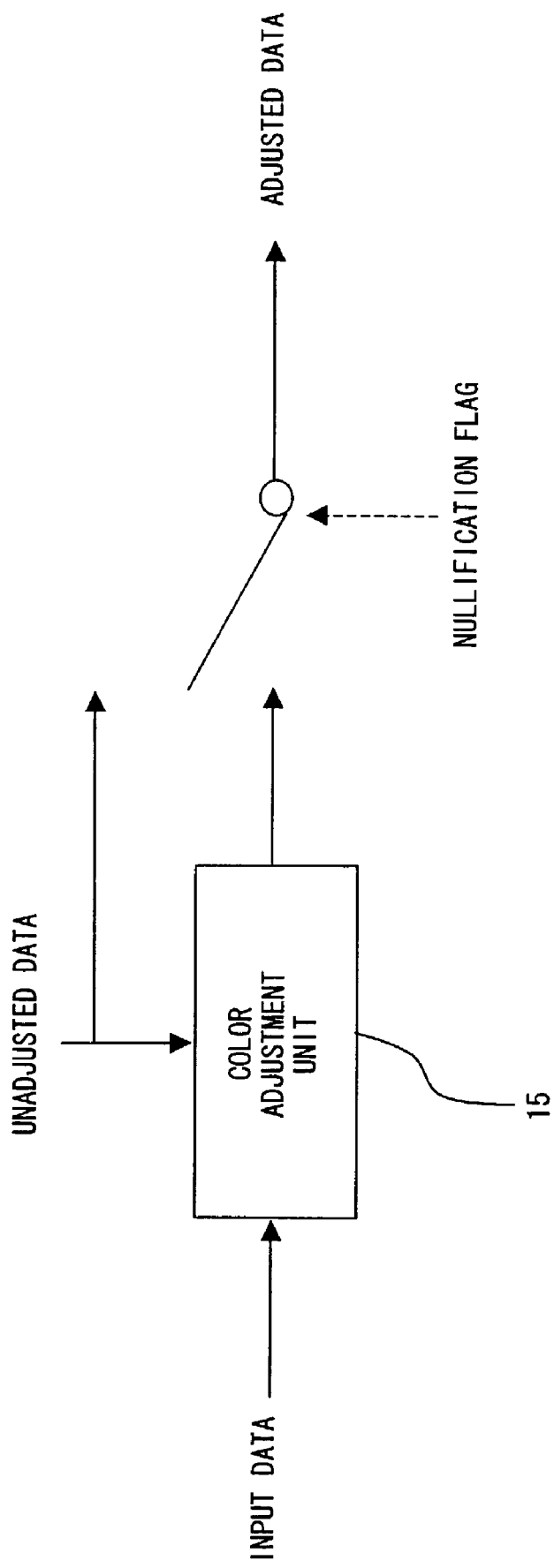
FIG. 11 shows a system configuration for explanation of the fifth embodiment of the present invention.

The above mentioned example is configured such that an inverse color conversion is performed corresponding to the first embodiment, but also can be configured such that an inverse color conversion can be performed corresponding to the above mentioned second embodiment as shown in FIG. 11A. Furthermore, as shown in FIG. 11B, the above mentioned example can also be configured such that the inverse color conversion can be performed corresponding to the above mentioned third embodiment.

Fifth Embodiment

Described below is the fifth embodiment of the present invention.

Figure 12:
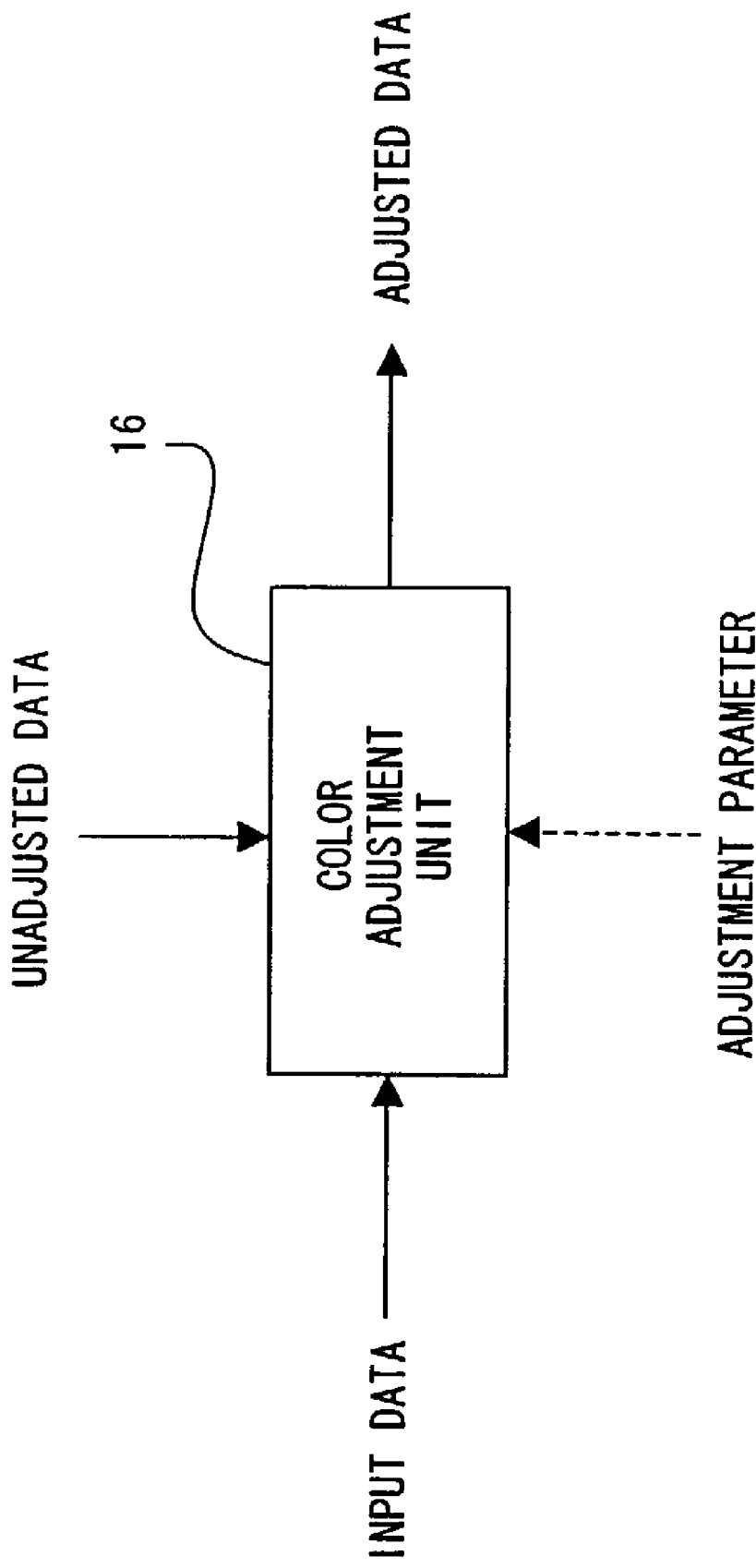
FIG. 12 shows a system configuration for explanation of the sixth embodiment of the present invention.

This system is configured to nullify the function of the above mentioned color adjustment unit as necessary. FIG. 12 shows the basic system of the present embodiment. A color adjustment unit 15 shown in FIG. 12 is a color adjustment unit used in the first through fourth embodiments of the present invention, and unadjusted data (output data (Co Mo Yo Ko)) is color-adjusted based on the input data.

In the present embodiment, it is determined by setting a nullification flag in advance which is selected, the output of the color adjustment unit 15 is used, or the unadjusted output data (Co Mo Yo Ko) is used as is.

The following equation (3) is used in the present embodiment. that is:

$$C=Co \times (Ci \vee \overline{Mi} \vee Yi \vee Ki) \cdot (Ci \vee Mi \vee \overline{Yi} \vee Ki \vee F)$$

$$M=Mo \times (\overline{Ci} \vee Mi \vee Yi \vee Ki) \cdot (Ci \vee Mi \vee \overline{Yi} \vee Ki \vee F)$$

$$Y=Yo \times (Ci \vee Mi \vee Yi \vee Ki) \cdot (Ci \vee Mi \vee Yi \vee Ki \vee F)$$

The above mentioned equation is configured by adding the flag (F) to the last term (logical sum) of the above mentioned equation (1). For example, a flag F is set such that the logical sum of the last term can be 0. With the configuration, the adjusted output can be nullified.

Sixth Embodiment

Described below is the sixth embodiment of the present invention.

The present embodiment is set for explanation of the process procedure for embodying the process in each embodiment using a setting screen.

Figure 13A:
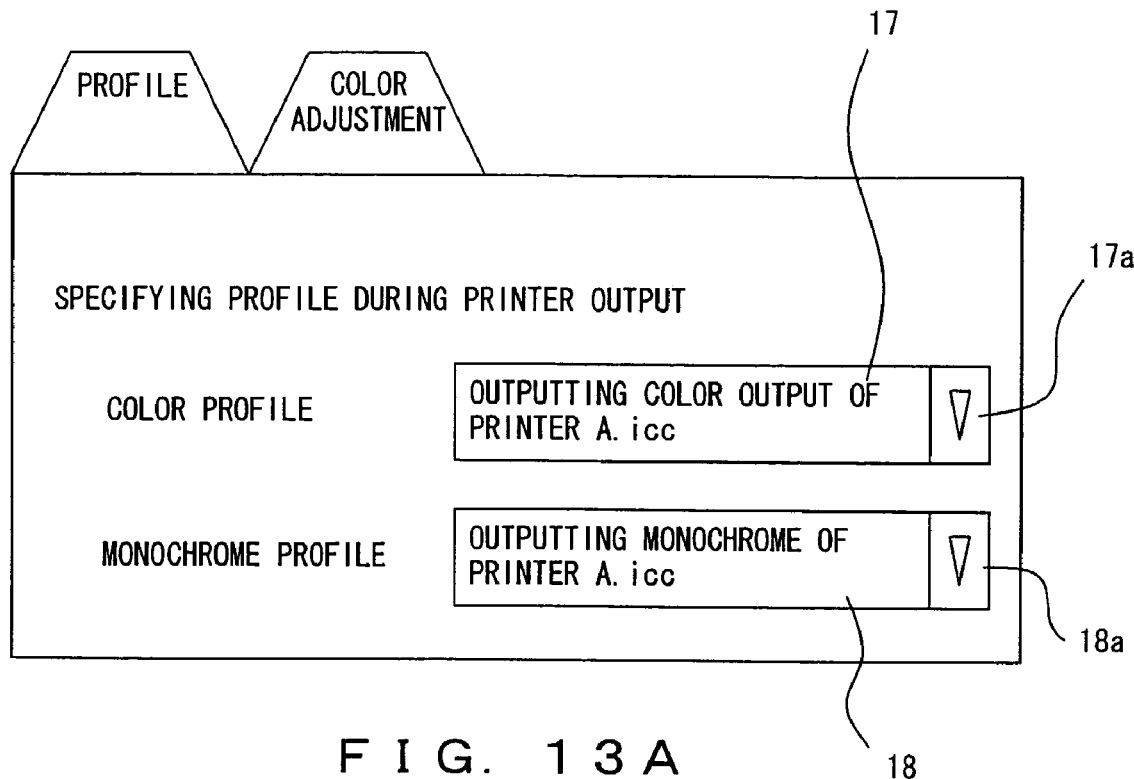
FIG. 13A is an explanatory view of the screen showing the process of selecting a color conversion profile.
Figure 13B:
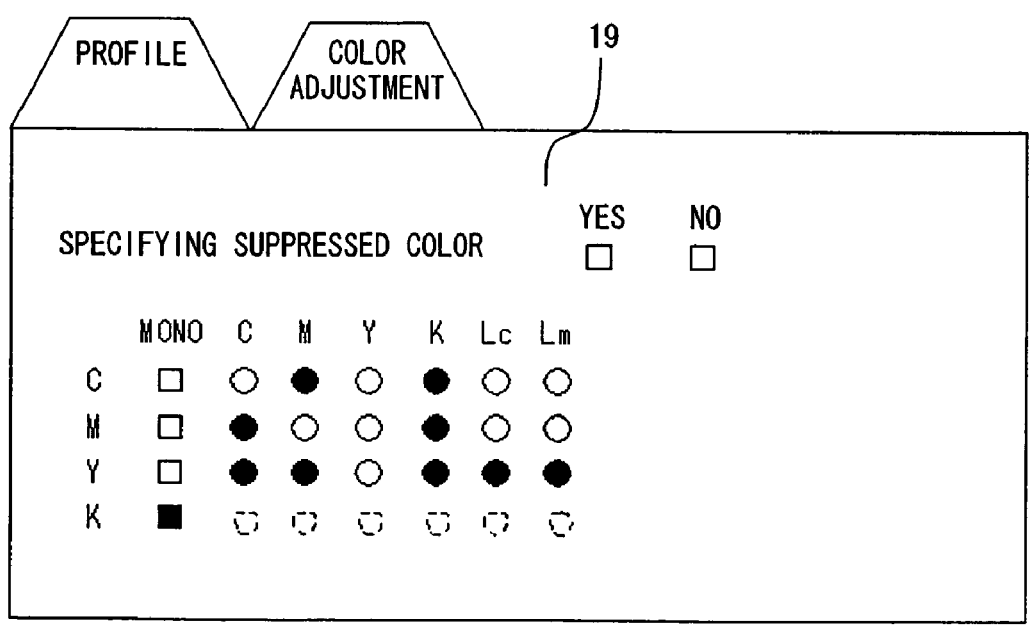
FIG. 13B is an explanatory view of the screen showing the process of setting an adjustment parameter.

FIG. 12 shows the basic configuration of this system. Unadjusted data is input into a color adjustment unit 16, and a color adjusting process is performed according to an adjustment parameter. FIG. 13A is a setting screen of the above mentioned color conversion profile, and FIG. 13B is an adjustment parameter setting screen.

In the above mentioned first through fifth embodiments, a color conversion profile corresponding to a device is set in the color conversion unit, and an adjustment parameter is set in the color adjustment unit. These processes are explained below by referring to FIGS. 13A and 13B.

Figure 14:
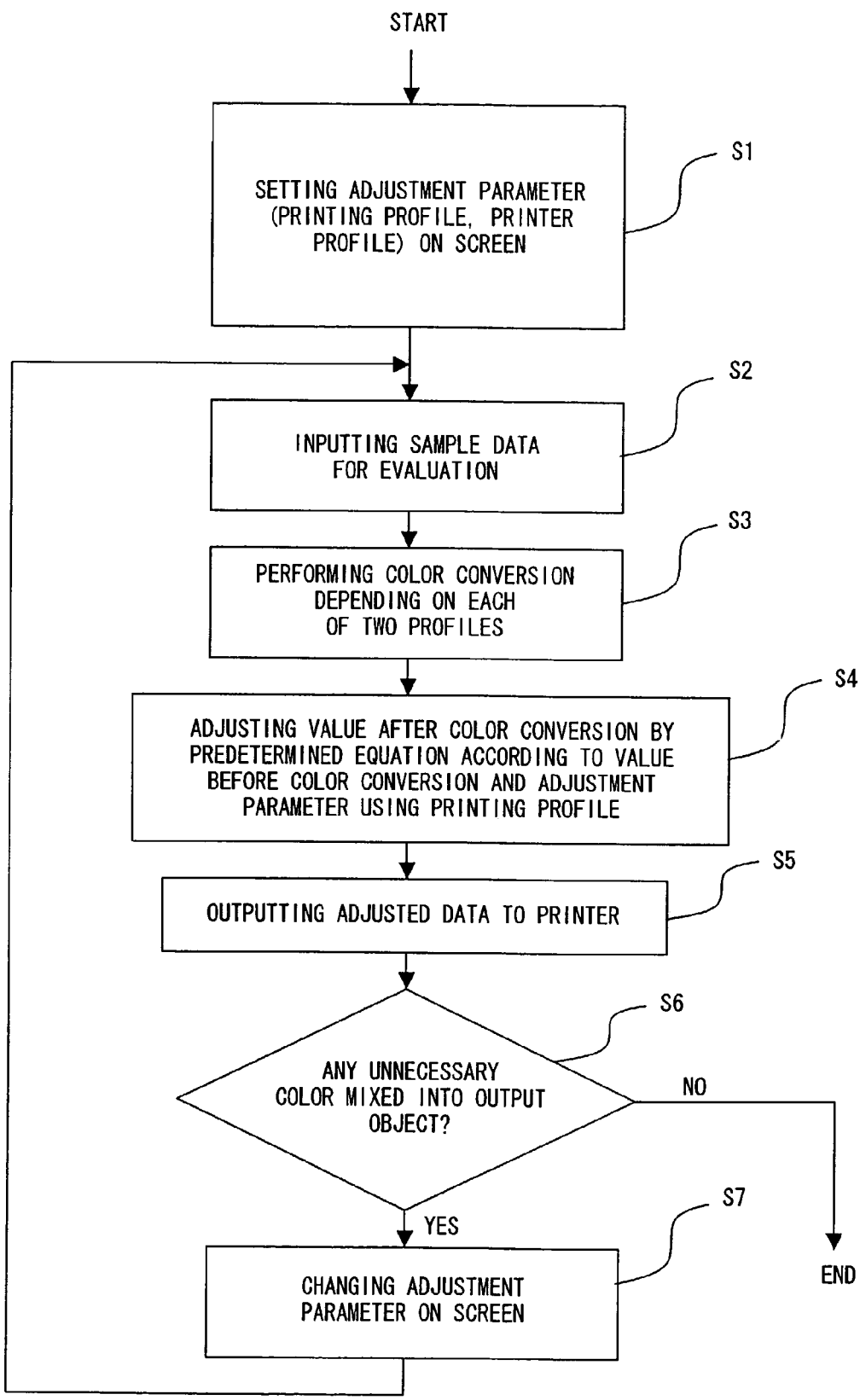
FIG. 14 is a flowchart for explanation of the process according to the present invention.

First, FIG. 14 is a flowchart of the process of setting a color conversion profile and an adjustment parameter. First, a color conversion profile setting screen shown in FIG. 13A is displayed on the display unit not shown in the attached drawings. On the setting screen, a color conversion profile output on the printer is specified (step (hereinafter represented by S) 1). The setting is performed on the color profile and the monochrome profile.

For example, a color profile corresponding to a device is selected by checking a scroll button 17a. In the example shown in FIG. 13, a profile of the printer A is displayed as a device on a display unit 17. Additionally, a monochrome profile corresponding to a device is selected by checking a scroll button 18a. In the example shown in FIG. 13, the profile of the printer A is displayed as a device on a display unit 18.

After setting the color conversion profile in the above mentioned process, sample data for evaluation is input as input data (S2). For example, the input data (0, 0, 100, 0) shown as the data No. 1 in FIG. 3 is input. The input data of No. 2 through No. 6 shown in FIG. 3 can also be input.

Thus, the input data is color-converted by the color conversion unit 1 in which the color conversion profile is set (S3), and is treated in the color adjusting process by the color adjustment unit 2 (S4).

The color-adjusted data (C M Y K) is output to the printer device not shown in the attached drawings, and the printing process is performed according to the adjusted data (C M Y K) (S5). The printer device can be, for example, a printer device in the ink jet system. In this system, the ink of cyan (C), magenta (M), yellow (Y), and black (K) is sprayed onto the recording paper, and mixed color is clearly printed.

Then, a print result output on the printer device is checked, and it is determined whether or not unnecessary color is mixed and detected on the printed object (S6). If an unnecessary color is not detected on the printed object (NO in S6), then the process terminates. If an unnecessary color is mixed (YES in S6), then the adjustment screen shown in FIG. 13B is opened, and the adjustment parameter is changed (S7).

If the adjustment parameter is changed, the sample data for evaluation is input again, the color conversion unit 1 performs the color converting process, a color adjustment is performed for printout, and it is determined whether or not an unnecessary color is mixed and detected on the printed object. Then, the above mentioned processes are repeated, the adjustment parameter is adjusted, and an adjustment parameter is set with the color mixing suppressed.

Thus, after setting the adjustment parameter, the print data color converting process described above by referring to the first embodiment is performed.

Figure 15:
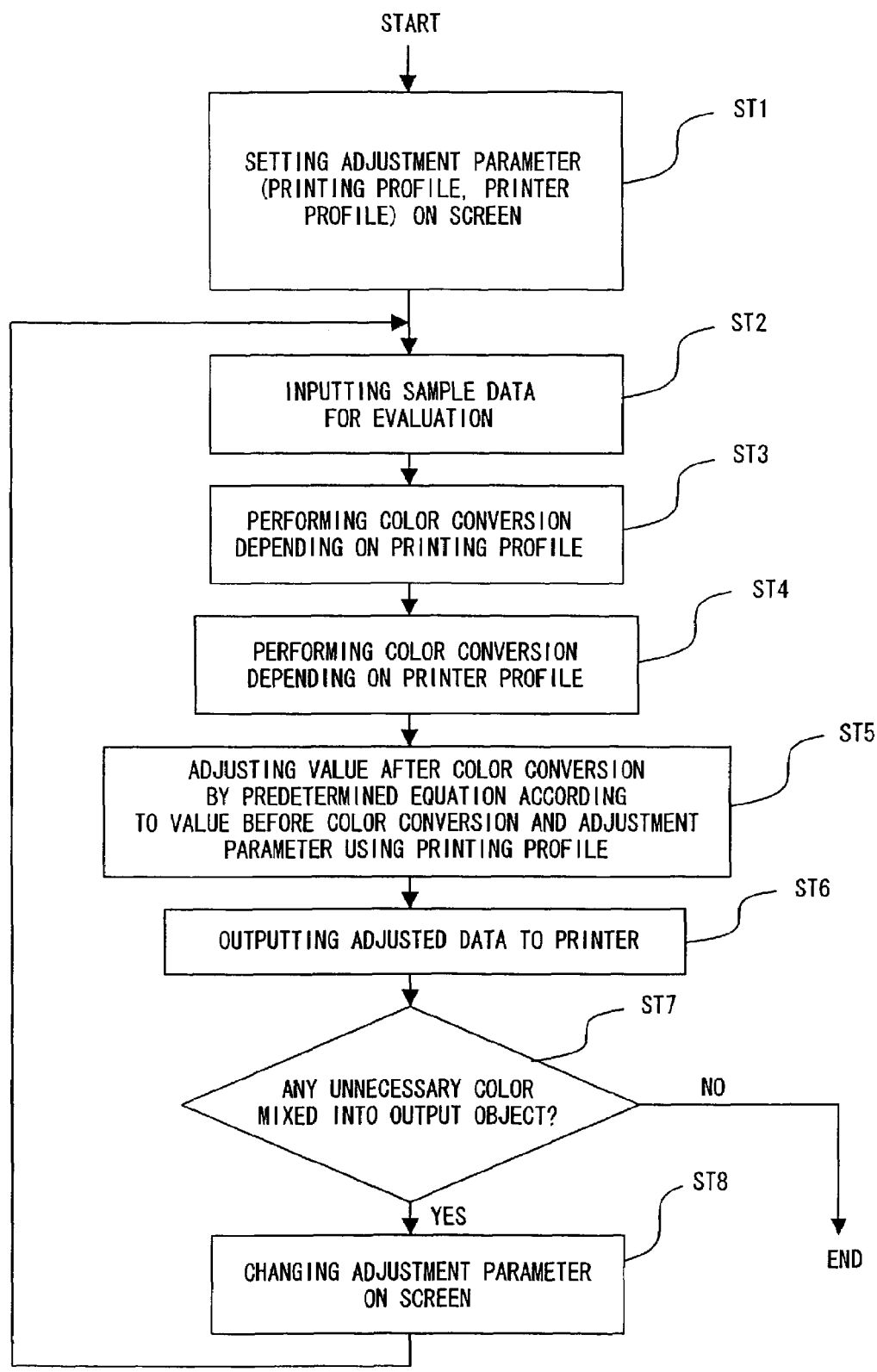
FIG. 15 is a flowchart for explanation of the process according to the present invention.

FIG. 15 is a flowchart of the process of setting a color conversion profile and a color adjustment corresponding to the second embodiment. In this case, as described above, a setting screen of a color conversion profile shown in FIG. 13A is displayed on the display device as already described above, and a color conversion profile is set when the printer output is performed (step (hereinafter represented by ST) 1).

As in the above mentioned process, the sample data for evaluation is input (ST2), the color converting process is performed using the printing profile (ST3), and the color converting process is performed using the printer profile (ST4).

Next, the color adjusting process is performed by the color adjustment unit 5 (ST5). Thus, the color-adjusted data (C M Y K) is output to the printer device, which is a corresponding device, and the printing process is performed based on the adjusted data (C M Y K) (ST6). Afterwards, a print result is checked, and if an unnecessary color is not mixed and detected on a printed object (NO in ST7), then the process terminates. If an unnecessary color is mixed and detected on a printed object (YES in ST7), then the adjustment screen shown in FIG. 13B is opened and the adjustment parameter is changed (ST8).

Furthermore, FIG. 16 is a flowchart of the process of setting a color conversion profile and a color adjustment corresponding to the third embodiment of the present invention. As described above, the setting screen of a color conversion profile shown in FIG. 13A is displayed on the display device, and the color conversion profile is set when the printer output is performed (step (hereinafter represented by STP) 1).

Then, as in the above mentioned process, the sample data for evaluation is input (STP2), and a color converting process is performed based on the printing profile (STP3). Next, a color conversion based on the color profile is performed, and a color conversion based on the printer profile is performed (STP4). Thus, either of the color-converted output data is selected by the color adjustment unit (STP5), and output to the printer device (STP6).

Furthermore, a print result is similarly checked, and if an unnecessary color is not mixed and detected on a printed object (NO in ST7), then the process terminates. If an unnecessary color is mixed and detected on a printed object (YES in ST7), then the adjustment screen shown in FIG. 13B is opened and the adjustment parameter is changed (ST8).

As described above, the color conversion profile shown in FIG. 13A is set, the adjustment parameter shown in FIG. 13B is adjusted, and an adjustment parameter having no problem with the print result is used, thereby using the color conversion profile without a change, and performing the color adjusting process within a short time.

A setting area 19 shown in FIG. 13B is a flag setting area set when the color adjustment output is nullified according to the fifth embodiment. When a nullification flag is set, a 'setting' area is checked, and if a nullification flag is not set, then a 'no-setting' area is checked.

A practical setting of an adjustment parameter can be set by checking the areas corresponding to cyan (C), magenta (M), yellow (Y), and black (K).

The device described according to the above mentioned embodiments is a printer device and a printer, but can also be applied to the case in which a display in the additive process system is used as a device.

Additionally, the process described in the present embodiment can also be performed using a computer (information processing device) with the configuration shown in FIG. 17. A computer 20 shown in FIG. 17 comprises a CPU 21, memory 22, an input device 23, an output device 24, an external storage device 25, a medium drive device 26, and a network connection device 27. These components are interconnected through a bus 28.

The memory 22 comprises, for example, ROM (read only memory), RAM, etc., and stores a program and data for use in a process. The CPU 21 performs the above mentioned process by executing a program using the memory 22. The process is shown in the above mentioned flowchart.

The external storage device 25 is, for example, a magnetic disk device, an optical disk device, a magneto-optical disk device, etc. The above mentioned program and data are stored in the external storage device 25 to load them into the memory 22 for use as necessary.

The medium drive device 26 drives a portable storage medium 29, and accesses the contents stored on it. The portable storage medium 29 can be a computer-readable storage medium such as a memory card, a memory stick, a flexible disk, CD-ROM (compact disc read only memory), an optical disk, a magneto-optic disk, a DVD (digital versatile disk), etc.

The above mentioned program and data can be stored on the portable storage medium 29 for use as necessary by loading them into the memory 22.

The network connection device 27 communicates with external devices through an arbitrary network (circuit) such as a LAN, a WAN, etc. and converts data for communications, and can receive the above mentioned program and data from an external device to load them into the memory 22.

Figure 18:
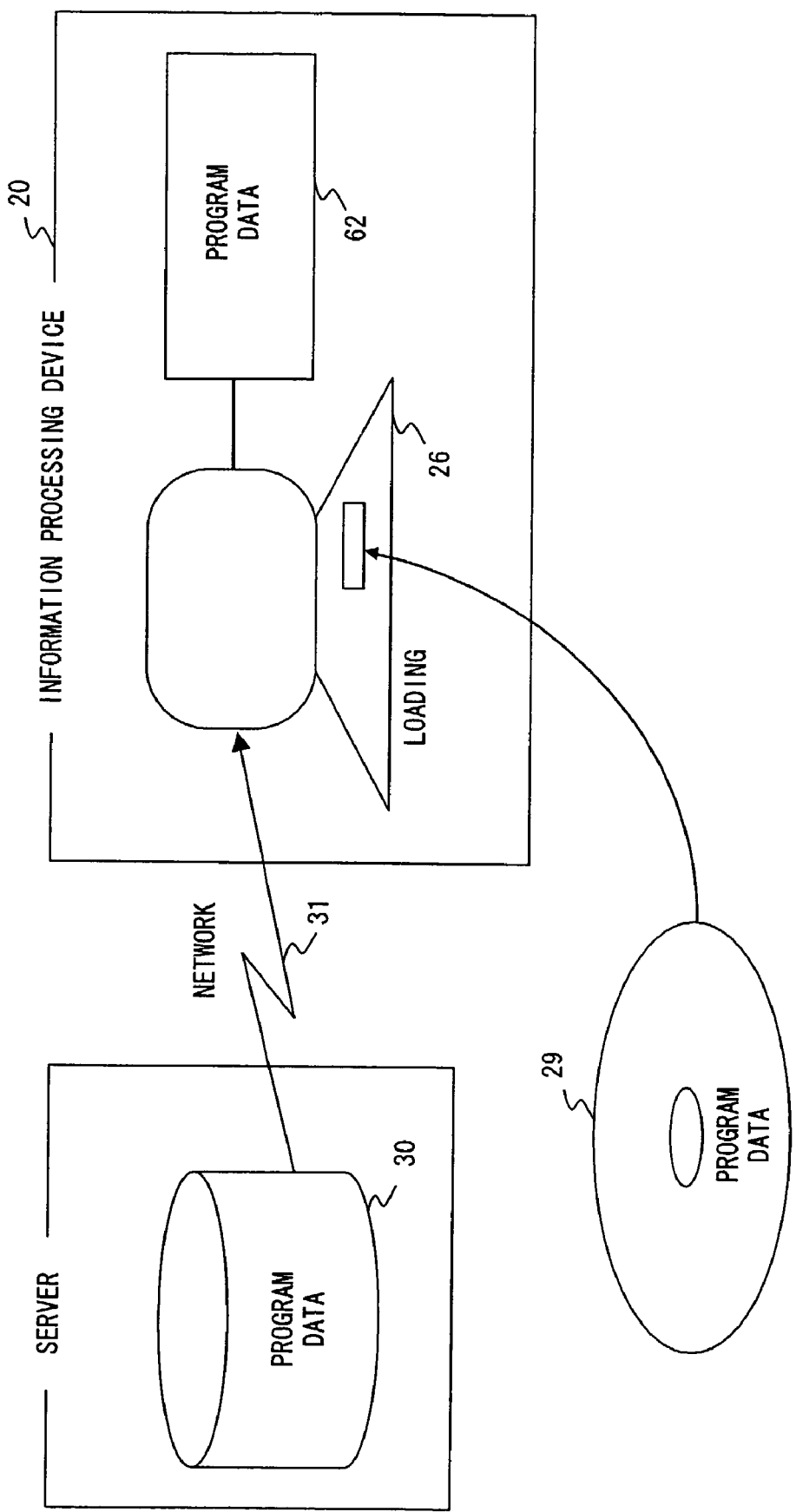
FIG. 18 shows a storage medium.

FIG. 18 shows a computer-readable storage medium and a transmission signal capable of providing the computer shown in FIG. 17 with a program and data.

The above mentioned program and data stored on each table are provided for the computer 20 as follows, thereby allowing the computer 20 to perform the above mentioned functions. To attain this, the above mentioned program and data are stored in advance on the computer-readable storage medium 29.

Then, as shown in FIG. 18, the programs, etc. are read from the storage medium 29 to the computer 20 using the medium drive device 26, and temporarily stored in the memory 22 of the computer 20 and the external storage device 25, thereby allowing the CPU 21 of the computer 20 to read the stored program for execution.

Instead of allowing the computer to read the program from the storage medium 29, the program can be downloaded from a DB 30 of a program (data) provider through a communications circuit (network) 31.

Thus, the embodiments of the present invention have been described above, but the present invention is not limited to them, and a number of variations can be realized.

As explained above, color-converted output data according to the color conversion profile can be color-adjusted by the color adjustment unit according to the present invention, thereby avoiding the mixing of unnecessary colors without a complicated color adjusting process.

Furthermore, when the color adjustment unit has no problem with the visual recognizability, the conversion output of the color conversion profile is output as is to a device, thereby realizing a higher-speed color converting process.

Additionally, the an adjustment parameter is adjusted as necessary, and a more flexible color adjusting process can be performed.

What is claimed is:

1. A color conversion apparatus comprising:
   a first color conversion unit having a color conversion profile corresponding to a device, and color-converting input data containing color information according to the color conversion profile;
   a second color conversion unit having a monochrome profile corresponding to the device, and converting input data containing color information according to the monochrome profile;
   a color adjustment unit selecting one of output of said first color conversion unit and output of said second color conversion unit according to the color information about the input data; and
   an output unit providing the device with the output selected by said color adjustment unit.

2. The apparatus according to claim 1, further comprising an inverse color conversion unit receiving output data from said color conversion unit and generating input data by referring to a color conversion profile of said color conversion unit, wherein said color adjustment unit performs a color adjustment using the input data generated by said inverse color conversion unit.

3. The apparatus according to claim 2, further comprising:
a setting unit setting a color conversion profile in said inverse color conversion unit; and
a changing unit changing an adjustment parameter of said color adjustment unit.

4. The apparatus according to claim 1, further comprising a nullification setting unit nullifying color adjustment output from said color adjustment unit.

* * * * *